US010876760B2

(12) United States Patent
Paul

(10) Patent No.: US 10,876,760 B2
(45) Date of Patent: Dec. 29, 2020

(54) SECURED MOUNTING FRAME FOR AN AIR CONDITIONING UNIT

(71) Applicant: Velma Concetta Paul, Boston, MA (US)

(72) Inventor: Velma Concetta Paul, Boston, MA (US)

( * ) Notice: Subject to any disclaimer, the term of this patent is extended or adjusted under 35 U.S.C. 154(b) by 60 days.

(21) Appl. No.: 15/963,335

(22) Filed: Apr. 26, 2018

(65) Prior Publication Data

US 2018/0313575 A1    Nov. 1, 2018

Related U.S. Application Data

(60) Provisional application No. 62/490,927, filed on Apr. 27, 2017.

(51) Int. Cl.

| F24F 13/32 | (2006.01) |
| F16M 13/02 | (2006.01) |
| F24F 1/027 | (2019.01) |
| F16M 1/00 | (2006.01) |
| F24F 13/20 | (2006.01) |

(52) U.S. Cl.
CPC ............... *F24F 13/32* (2013.01); *F16M 1/00* (2013.01); *F16M 13/02* (2013.01); *F24F 1/027* (2013.01); *F24F 13/20* (2013.01); *F24F 2221/20* (2013.01)

(58) Field of Classification Search
CPC ........ F24F 13/32; F24F 1/027; F24F 13/1406; F24F 13/20; F24F 2221/20; F24F 7/013; E06B 9/02; E06B 9/01; E06B 5/11; E06B 7/28; E06B 2009/015; E06B 2009/002; E06B 9/04; E04G 3/18
USPC .......................................................... 52/202
See application file for complete search history.

(56) References Cited

U.S. PATENT DOCUMENTS

| 1,536,939 A | * | 5/1925 | Schuldt | E06B 9/01 160/92 |
| 1,633,848 A | * | 6/1927 | Dandridge | E06B 9/01 49/57 |
| 1,657,908 A | * | 1/1928 | Wulftange | E06B 9/01 52/507 |
| 1,808,971 A | * | 6/1931 | Roberts | A47H 1/13 248/259 |
| 1,916,907 A | * | 7/1933 | Sargent | F24F 6/025 165/48.1 |
| 2,342,229 A | * | 2/1944 | Trone | E06B 7/28 607/95 |
| 2,430,343 A | * | 11/1947 | Karwacki | E05B 65/0007 292/106 |
| 2,433,104 A | * | 12/1947 | Eberhart | F24F 1/04 454/203 |
| 2,529,040 A | * | 11/1950 | Morrison | F04D 25/12 454/208 |
| 2,674,430 A | | 4/1954 | Galazzi et al. | |
| 2,702,175 A | | 2/1955 | Irving | |

(Continued)

*Primary Examiner* — Hiwot E Tefera
*Assistant Examiner* — Taylor L Morris
(74) *Attorney, Agent, or Firm* — Wilmer Cutler Pickering Hale and Dorr LLP

(57) ABSTRACT

A frame for an air conditioning unit comprising a L or U shaped stability bar configured to receive a movable portion of a window, a plurality of coupling holes configured to couple the frame to the air conditioning unit, a security platform protruding from a posterior of the frame and a plurality of locking plates coupled to a front portion of the frame.

17 Claims, 12 Drawing Sheets

(56) References Cited

U.S. PATENT DOCUMENTS

| | | | | |
|---|---|---|---|---|
| 2,717,508 A * | 9/1955 | Loveley | F24F 1/027 | 62/262 |
| 2,758,456 A * | 8/1956 | Wheeler | F24F 1/027 | 62/262 |
| 2,781,717 A * | 2/1957 | Hord | F24F 1/04 | 454/203 |
| 2,818,793 A * | 1/1958 | Hord | F24F 1/04 | 454/203 |
| 2,891,754 A * | 6/1959 | Kuhlenschmidt | F24F 13/32 | 248/208 |
| 2,914,818 A * | 12/1959 | Pritzert | E06B 7/22 | 49/70 |
| 2,935,284 A * | 5/1960 | Reeves | E04G 3/18 | 248/208 |
| 2,945,358 A | 7/1960 | McLeod et al. | | |
| 2,946,274 A * | 7/1960 | Grimes, Jr. | E06B 7/02 | 454/203 |
| 2,998,711 A * | 9/1961 | Komroff | F24F 1/027 | 62/262 |
| 3,002,236 A | 10/1961 | Humphner | | |
| 3,006,498 A * | 10/1961 | Thiede | F24F 1/58 | 220/255 |
| 3,081,690 A * | 3/1963 | Gesmar | F24F 3/1603 | 454/205 |
| 3,111,076 A | 11/1963 | Martin et al. | | |
| 3,134,319 A * | 5/1964 | Marsteller | F24F 1/04 | 454/203 |
| 3,167,828 A * | 2/1965 | Hutchisson, Jr. | E06B 9/01 | 49/57 |
| 3,213,636 A * | 10/1965 | MacLeod | F24F 1/04 | 62/262 |
| 3,214,123 A * | 10/1965 | Knaebe | E06B 7/28 | 248/224.7 |
| 3,246,593 A * | 4/1966 | Jacobs | F24F 1/04 | 454/203 |
| 3,257,933 A * | 6/1966 | Baylinson | F24F 13/32 | 454/203 |
| 3,273,843 A * | 9/1966 | Bell, Jr. | F24F 13/32 | 248/208 |
| 3,328,929 A * | 7/1967 | Mullins | E06B 7/28 | 52/202 |
| 3,460,458 A * | 8/1969 | MacLeod | F24F 13/20 | 454/203 |
| 3,476,034 A | 11/1969 | Ulich | | |
| 3,757,494 A * | 9/1973 | Keuls | B01D 46/10 | 96/263 |
| 3,911,803 A * | 10/1975 | Kong | E06B 7/03 | 454/203 |
| 4,038,800 A * | 8/1977 | Daley, Jr. | E06B 9/01 | 52/507 |
| 4,067,204 A * | 1/1978 | Riello | F24F 1/027 | 62/262 |
| 4,202,389 A * | 5/1980 | Ewald | F24F 13/20 | 150/165 |
| 4,325,229 A * | 4/1982 | DeZurik | F24F 13/20 | 150/154 |
| 4,332,114 A * | 6/1982 | Goebel | F24F 13/20 | 182/47 |
| 4,453,456 A * | 6/1984 | Szkudlarek | E06B 7/03 | 160/89 |
| 4,510,852 A * | 4/1985 | Sorrentino | F24F 13/32 | 454/204 |
| 4,527,762 A * | 7/1985 | Duell | H05K 7/20172 | 248/222.14 |
| 4,788,805 A * | 12/1988 | Shaw | F24F 13/00 | 454/201 |
| 5,056,262 A * | 10/1991 | Schweiss | E05C 19/006 | 49/257 |
| 5,112,015 A * | 5/1992 | Williams | F16M 13/022 | 248/228.3 |
| 5,337,697 A * | 8/1994 | Trimarchi | A01K 1/033 | 119/484 |
| 5,341,860 A * | 8/1994 | Klein | F24F 13/20 | 150/165 |
| 5,365,992 A * | 11/1994 | Swain | F24F 13/32 | 160/84.01 |
| 5,443,110 A * | 8/1995 | Plott, Sr. | A62B 99/00 | 160/368.1 |
| 5,460,348 A * | 10/1995 | Cox | F16M 5/00 | 248/237 |
| 5,484,125 A * | 1/1996 | Anoszko | F24F 13/32 | 248/201 |
| 5,607,355 A * | 3/1997 | Van Becelaere | A62C 2/16 | 285/189 |
| 5,787,955 A * | 8/1998 | Dargie | E02D 29/12 | 160/368.1 |
| 5,815,996 A * | 10/1998 | Granger | F24F 7/02 | 52/202 |
| 5,823,289 A * | 10/1998 | Csomos | A47L 3/02 | 182/61 |
| 5,916,074 A * | 6/1999 | Tracy | E06B 9/02 | 49/141 |
| 5,967,478 A * | 10/1999 | Tynes | A47B 45/00 | 248/208 |
| 5,979,533 A | 11/1999 | Dupuie | | |
| 6,061,981 A * | 5/2000 | Nieves | F24F 13/20 | 52/202 |
| 6,161,605 A * | 12/2000 | Pena | E06B 9/0638 | 160/105 |
| 6,298,631 B1 * | 10/2001 | Finley | E04G 21/185 | 52/742.15 |
| 6,457,692 B1 * | 10/2002 | Gohl, Jr. | E04B 9/006 | 248/301 |
| 6,468,054 B1 * | 10/2002 | Anthony | F04D 25/12 | 417/360 |
| 6,540,093 B1 * | 4/2003 | Shumway | A47B 57/30 | 108/147.11 |
| 6,560,937 B1 * | 5/2003 | Gardner | B60P 3/34 | 52/201 |
| 6,880,792 B2 * | 4/2005 | Muir | E05C 17/045 | 248/276.1 |
| 6,907,749 B2 * | 6/2005 | Geary | F24F 5/0035 | 62/171 |
| 7,004,832 B2 * | 2/2006 | Thomas | B60H 1/00364 | 454/129 |
| 7,258,606 B1 * | 8/2007 | Reid | F24F 1/027 | 312/101 |
| 7,260,953 B2 * | 8/2007 | Kim | F24F 1/027 | 62/259.1 |
| 7,296,424 B2 * | 11/2007 | Thompson | F24F 1/027 | 62/115 |
| 7,350,759 B1 | 4/2008 | Gray | | |
| 7,526,896 B1 * | 5/2009 | Lohmeyer | E06B 9/02 | 49/50 |
| 7,654,044 B2 * | 2/2010 | Borland | E06B 9/02 | 52/202 |
| 7,975,441 B2 * | 7/2011 | McCarriston | F24F 1/027 | 248/208 |
| 8,091,844 B1 * | 1/2012 | Bragg | F24F 13/32 | 248/208 |
| 8,141,833 B1 * | 3/2012 | Plummer | E06B 9/02 | 248/229.1 |
| 8,167,260 B2 * | 5/2012 | Boccia | F24F 13/32 | 248/208 |
| 8,443,550 B1 * | 5/2013 | Burns | E06B 9/04 | 49/141 |
| 8,584,998 B1 * | 11/2013 | Peterson | F24F 13/32 | 182/62 |
| D704,812 S * | 5/2014 | Benjamin, Sr. | F04D 25/12 | D23/354 |
| 8,756,883 B2 * | 6/2014 | Glass | E06B 5/025 | 52/202 |
| 8,844,195 B2 * | 9/2014 | Cox | E06B 5/167 | 49/7 |
| 8,943,755 B2 * | 2/2015 | Herlihy | F24F 13/20 | 52/3 |
| 8,998,690 B1 * | 4/2015 | Virag | F24F 13/32 | 248/208 |

(56) References Cited

U.S. PATENT DOCUMENTS

| | | | | |
|---|---|---|---|---|
| 9,028,162 B1* | 5/2015 | Lagassey | ............... | E04H 9/14 403/319 |
| 9,163,854 B2* | 10/2015 | Arbucci | ............... | E06B 7/28 |
| 9,193,246 B2* | 11/2015 | Wood | ............... | B60H 1/245 |
| 9,303,887 B1* | 4/2016 | Chwala | ............... | F24F 13/32 |
| 9,303,895 B1* | 4/2016 | Grant | ............... | F24F 13/32 |
| 9,982,909 B1* | 5/2018 | Perez | ............... | F24F 13/32 |
| 10,203,130 B2* | 2/2019 | Gardikis, Sr. | ............... | F24F 13/32 |
| 10,655,889 B2* | 5/2020 | Tully | ............... | F24F 13/32 |
| 2006/0201042 A1* | 9/2006 | Kim | ............... | F24F 1/027 40/725 |
| 2007/0023592 A1* | 2/2007 | Makoso | ............... | E06B 7/28 248/200.1 |
| 2007/0290106 A1* | 12/2007 | Spivey | ............... | E06B 9/02 248/208 |
| 2008/0113611 A1* | 5/2008 | Chwala | ............... | F24F 7/025 454/341 |
| 2008/0127565 A1* | 6/2008 | Taylor | ............... | E05D 5/06 49/394 |
| 2008/0164390 A1* | 7/2008 | Walker | ............... | F24F 13/32 248/208 |
| 2009/0151276 A1* | 6/2009 | Debes, Jr. | ............... | E06B 9/02 52/203 |
| 2010/0270448 A1* | 10/2010 | Boccia | ............... | F24F 1/027 248/208 |
| 2010/0307179 A1* | 12/2010 | Fava | ............... | F24F 1/027 62/262 |
| 2011/0010997 A1* | 1/2011 | Kislov | ............... | E05B 65/1033 49/141 |
| 2011/0039490 A1* | 2/2011 | Wiese | ............... | F24F 7/013 454/200 |
| 2011/0283637 A1* | 11/2011 | Butler | ............... | E06B 9/02 52/202 |
| 2013/0153744 A1* | 6/2013 | Jin | ............... | F24F 13/32 248/670 |
| 2015/0253033 A1* | 9/2015 | Zanqueta | ............... | F24F 13/20 312/236 |
| 2015/0300002 A1* | 10/2015 | Feuer | ............... | F24F 13/0263 49/464 |
| 2016/0109150 A1* | 4/2016 | De Jesus | ............... | E06B 7/28 49/55 |
| 2016/0334130 A1* | 11/2016 | Faldetta | ............... | F24F 13/224 |
| 2017/0175379 A1* | 6/2017 | Ferrer Garcia | ............... | E06B 1/36 |
| 2017/0297768 A1* | 10/2017 | Gamboa | ............... | B65D 21/086 |
| 2018/0372372 A1* | 12/2018 | Mavrommatis | ............... | F24F 13/32 |

* cited by examiner

SIDE VIEW: (100) Front Facing Flange, attached to Rear Support Platform (200)

FRONT VIEW, Locking Apparatus (400)

Locking Pin (402)

LOCKING PLATES

SECURED MOUNTING FRAME FOR AN AIR CONDITIONING UNIT

PRIORITY INFORMATION/INCORPORATION BY REFERENCE

This application claims priority to U.S. Provisional Application 62/490,927, filed on Apr. 27, 2017 entitled "Easily Detachable, Burglar-Proof, Topple-Inhibiting Expandable Metal/Plastic FACING To Secure (1) Window Air Conditioners, (2) Windows That Contain Air Conditioning Units and (3) Other Applications" which is incorporated herein, in its entirety by reference.

BACKGROUND INFORMATION

Window air conditioner ("AC") units are an essential aspect for many homes and apartments throughout the world. Particularly in inner city pre-war apartment buildings that lack HVAC systems. Traditionally window air conditioners are boxy and heavy and a hassle to install, as well as a danger if installed incorrectly. The cantilever design of window air conditioner units makes them back heavy which causes them to fall backward out of the window and possibly on to pedestrians or anyone below the window. Additionally, window air conditioner units can be pulled out or kicked in allowing access to apartments and homes by burglars. For these reasons many people fasten their air conditioner units to the window frame using screws or other fasteners. However, this creates a separate hazard of removing the air conditioning unit during emergency situations.

SUMMARY

An apparatus is described that includes a mounting frame for an air conditioning unit, comprising a front facing flange that further comprises, a top member, a bottom member, and two side members that form a rectangular opening, wherein the side member includes a locking plate, and a rear security platform coupled to the front facing flange, wherein, when the mounting frame is installed into a window, the front facing flange is configured to receive the air conditioning unit through the rectangular opening and the rear security platform supports the air conditioning unit. The top member of the frame comprises an L-shaped stability bar or a U-shaped stability bar. The side members include screw holes or hooks for securing the air conditioning unit to the mounting frame. The rear security platform is coupled to the lower member and is coupled to the lower member via a hinge, wherein, in an open position, the rear security platform is configured to receive the air conditioning unit, and, in a closed position, the rear security panel platform is configured to seal the rectangular opening. The rear security platform is moved to the closed position by attaching the rear security platform to one of the side members or top member of the front facing flange via a hook. The mounting frame further comprises one or more panels coupled to the front facing flange and configured to be one of slid out or folded out to about the air conditioning unit to seal any excess space in the rectangular opening when the air conditioning unit is installed. The front facing flange of the mounting frame includes a handle. The locking plate is configured to secure the mounting frame to an interior structure of a building in which the air conditioning unit is installed and comprises an eyelet configured to receive a locking pin to secure the mounting frame to the interior structure. The mounting frame may comprise a plurality of locking plates. The frame may also comprise a security panel configured to be coupled to the front facing flange to seal the rectangular opening and panels configured to be coupled to the front facing flange and air conditioning unit to seal any excess space in the rectangular opening when the air conditioning unit is installed and the rear security platform includes a plurality of openings. The mounting frame may comprise one of plastic, wood, fiberglass, metal, or a composite material. A method for installing the mounting frame into a window comprising inserting the mounting frame into a window opening, securing the mounting frame to an interior wall using locking plates and locking pins, installing the air conditioning unit into the opening of the front facing flange of the mounting frame and securing the air conditioning unit to the mounting frame or optionally using expandable panels if there is excess space as needed. A method for removing the mounting frame of claim 1 from a window, comprising removing the locking pins from the locking plates on the interior wall, removing the air conditioner from the rectangular opening of the front facing flange of the mounting frame, determine if the entire mounting frame is to be removed or just the air conditioner and installing the security panel, or removing the pins from the locking plate and removing the mounting frame from the window.

DETAILED DESCRIPTION

Figure 1:
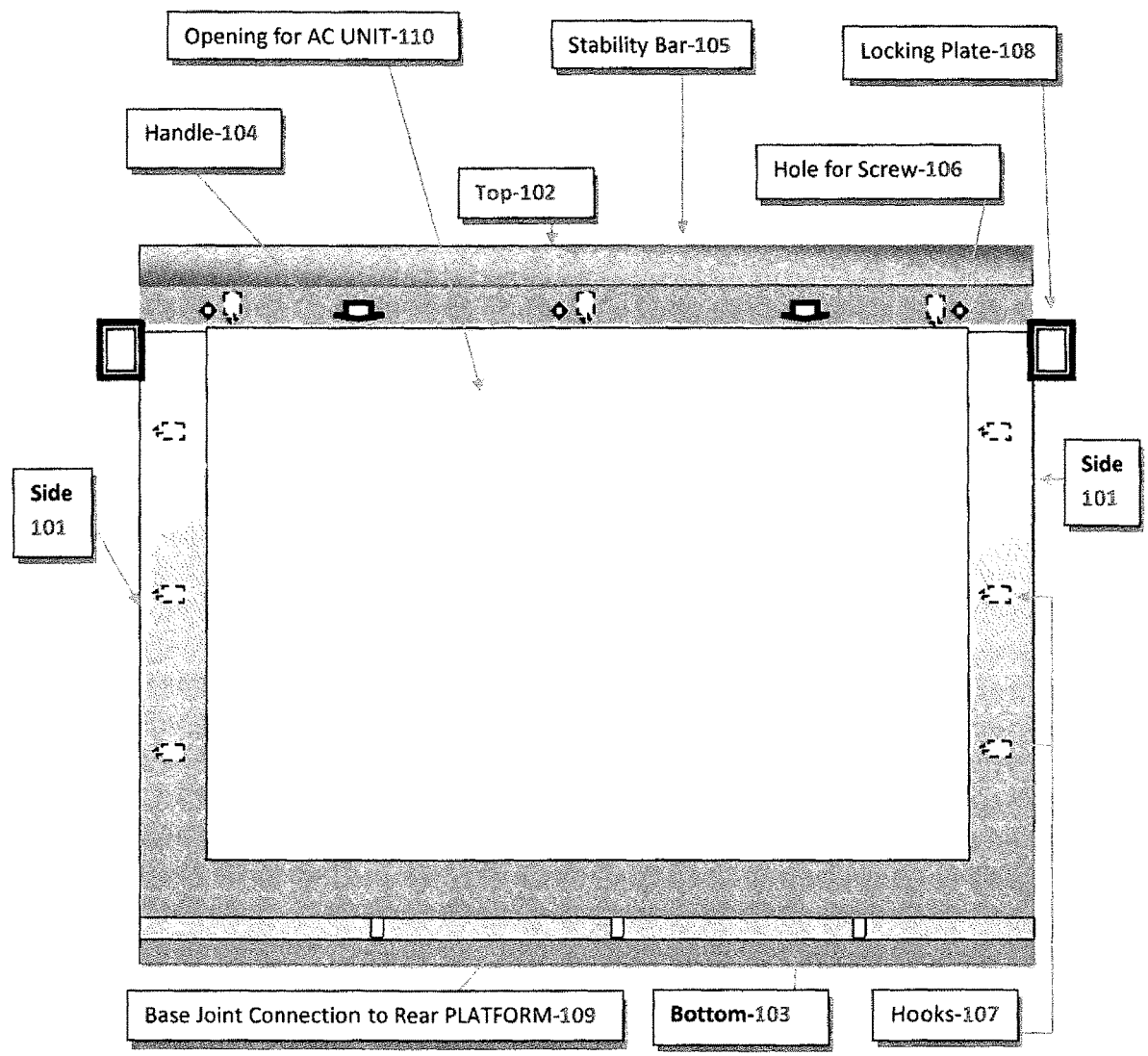
FIG. 1 shows a front view of an exemplary embodiment of a secured mounting frame for an air conditioning unit according to various embodiments described herein.

The exemplary embodiments may be further understood with reference to the following description and the appended drawings, wherein like elements are referred to with the same reference numerals. The exemplary embodiments describe a device, which provides a mounting frame for a window air conditioning unit.

As will be described in greater detail below, the exemplary device may provide a mounting frame to which a window air conditioning ("AC") unit may be secured. Specifically, the exemplary mounting frame provides a safe and easy manner of installing and removing a window AC unit without the danger of the window AC unit falling out the window. In addition, the exemplary mounting frame also provides a secure connection to an interior wall of the room in which the AC unit is installed so that the AC unit or mounting frame may not be pushed or kicked back into the room allowing access to the room by unwanted individuals. However, the secure connection is easily removable when inside the room allowing individuals to remove the AC unit and gain access to the window opening in emergency situations.

FIG. 1 shows a front view of an exemplary embodiment of a secured mounting frame 1 for an AC unit according to various embodiments described herein. The components of the mounting frame 1 that will be described in greater detail below may be constructed of any type of material. Exemplary materials include plastics, wood, fiberglass, metals, alloys, composite or any other rigid and sturdy materials. Different components of the mounting frame 1 may be constructed of the same or different materials.

The secured mounting frame 1 comprises a front facing flange 100 that is comprised of two side members 101, a top member 102 and a bottom member 103. The members 101-103 of the front facing flange 100 form an opening 110 for an AC unit. The opening 110 is generally rectangular and the size may vary to fit common sizes of window AC units. However, it should be understood that the front facing flange 100 and/or the opening 110 may comprise any shape that can fit within the dimensions of a window and which can accommodate window AC units. For example, while it is common that windows are generally rectangular or square, there are instances where windows are different shapes, e.g., circular, semicircular, etc. The front facing flange 100 may be shaped to be received into these other shapes of windows. For example, if the window to receive the AC unit were circular, the front facing flange 100 may be circular such that the mounting frame 1 may fit into the circular window. In such an example, those skilled in the art will understand there would be no side members 101, top member 102 or bottom member 103, but rather a rounded front facing flange that comprised a generally circular perimeter member. The opening 110 that receives the AC unit in such an example could also be circular or it could also be rectangular. Assuming that the AC unit is generally rectangular, when the opening 110 is some other non-rectangular shape, the opening 110 may be filled in with expandable panels (described in greater detail below) to fill in the area from the perimeter of the AC unit to the perimeter of the opening 110. These examples are provided to illustrate that while the exemplary front facing flange 100 is shown as having a generally rectangular shape with a generally rectangular opening 110, the rectangular shape is not a requirement and the four members 101-103 are merely exemplary for the exemplary rectangular shape.

In the example of FIG. 1, the front facing flange 100 would be the portion of the mounting frame 1 that would be visible to a person that is inside the room where the AC unit is mounted. As will be described in greater detail below, when the AC unit is mounted into the mounting frame 1 some or all of the front facing flange 100 may be obscured by the AC unit, but for the purposes of this description, it may be considered that a person would see the front facing flange 100 when the mounting frame 1 is inserted into the window, but before the AC unit is mounted within the mounting frame 1.

The top member 102 further comprises a handle 104 and an L- or U-shaped stability bar 105. The handle 104 may be used to hold or carry the mounting frame 1 when installing or removing the mounting frame 1. The stability bar 105 may be used to help secure the mounting frame 1 to the window. For example, if the window is a typical double or single hung sash window (e.g., where there is one or two movable frames that form the window) and the mounting frame 1 is mounted within an opening of the window, one of the movable frames may be moved down to engage the stability bar 105 so that the backside of the stability bar (in the case of the stability bar 105 having the L-shape) rests against a front or back side of the window frame. In the case of the stability bar 105 having a U-shaped stability bar 105, the window frame may be moved down to be inserted into the channel formed by the U-shape of the stability bar 105. The frame screw holes 106 that may be present in the top member 102 and may also be along the side members 101 and bottom member 103 may be used for fastening the AC unit to the mounting frame 1. That is, as will be described in greater detail below, the AC unit will not be fastened to the window itself, but rather the AC unit may be fastened to the mounting frame 1.

The side members 101 may also include hook holes 107 to fasten the security panel 200 to the mounting frame. The hook holes 107 (and corresponding hooks) may be used to secure the security platform 200 by connecting with the security platform hooks 111 when it is in an upright position to fill the opening for AC unit 110. The side members 101 may also include facing locking plates 108 that are to be used to secure the mounting frame 1 to interior walls of the room in which the AC unit is disposed. The apparatus and process of attaching the mounting frame 1 to the interior walls via the facing locking plates 108 will be described in greater detail below. The facing locking plates 108 are shown as being coupled to the upper portion of the side members 101. However, this is only exemplary and the facing locking plates 108 may be coupled in any position along the side member 101. In addition, each side member 101 may include more than one facing locking plates 108.

The bottom member 103 will be connected to a rear security platform 200 as will be described in greater detail below. The bottom member 103 (in combination with the rear security platform 200) may sit or rest on top of the sill of the window when the mounting frame 1 is mounted within the window.

Figure 2:
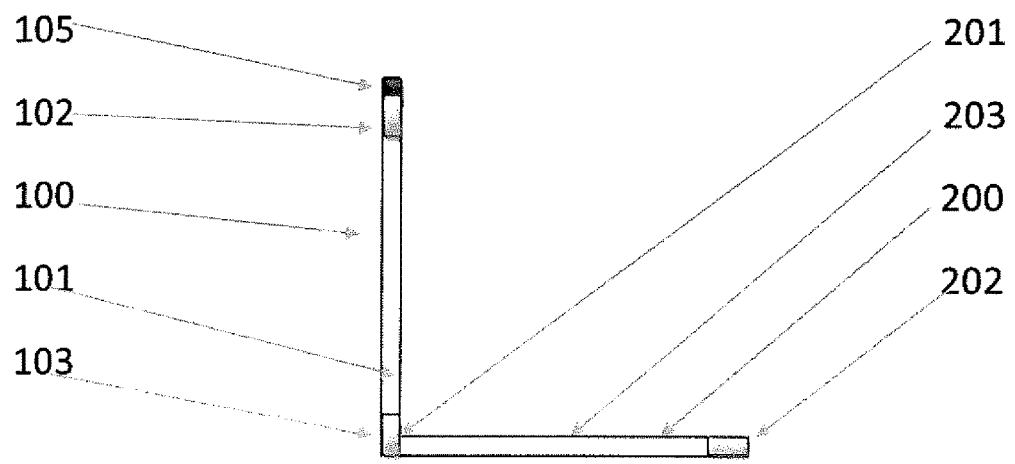
FIG. 2 shows a side view of an exemplary embodiment of the secured mounting frame according to various embodiments described herein.

FIG. 2 shows a side view of an exemplary embodiment of the secured mounting frame 1 according to various embodiments described herein. The mounting frame 1 includes the front facing flange 100 and the rear security platform 200. The front facing flange 100 comprises one side member 101, the top member 102 and the bottom member 103. The top member 102 is shown as including an L-shaped stability bar 105. In the embodiment shown in FIG. 2, the rear security platform 200 may be attached, either permanently fitted (e.g., welded, one integral piece, fixed hinge, etc.) or by detachable means (e.g., a friction fit, screwed, removable hinge etc.) at a base joint connection to the bottom member 103. An embodiment of the mounting frame 1 would have the rear security platform 200 secured by hinge so that it may be have a resting open position to receive and support an AC unit as well as a closed upright position to secure the window opening. When the rear security platform is in the closed/up-right position it may be secured by means of hook holes 107 and the security platform hooks 111. The rear security platform 200 protrudes from the bottom member 103 such that when the mounting frame 1 is mounted to a window, at least a portion of the rear security platform 200 is exterior to an outer wall of the dwelling. The rear security platform 200 is to support and further stabilize the unit and prevent unit from being suspended out of window.

Figure 3:
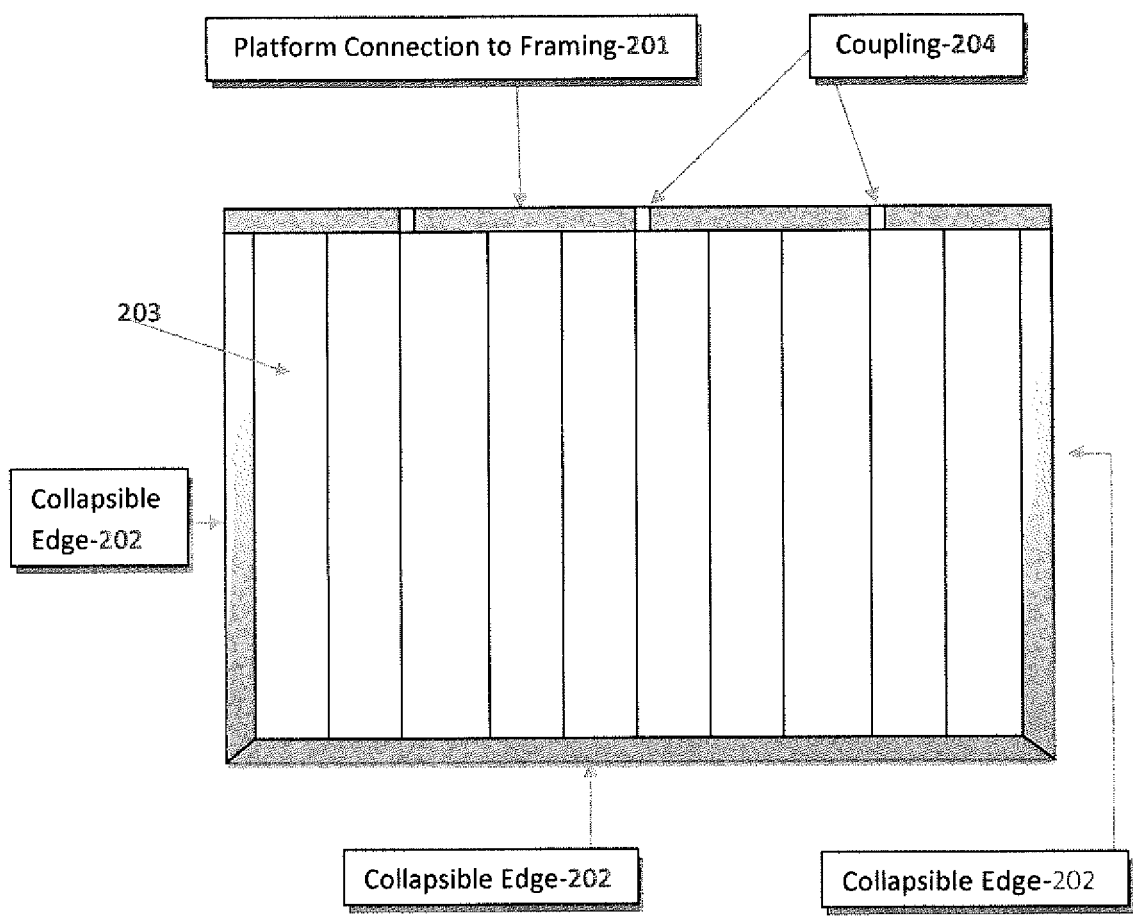
FIG. 3 shows a top view of an exemplary embodiment of a rear security platform of the mounting frame according to various embodiments described herein.

FIG. 3 shows a top view of an exemplary embodiment of the rear security platform 200 of the mounting frame 1 according to various embodiments described herein. The area 201 of the rear security platform 200 is where the rear security platform 200 is coupled (either permanently fitted e.g., welded, one integral piece, fixed hinge etc. or by detachable means e.g., a friction fit, screwed, removable hinged etc.) to the bottom member 103 of the front facing flange 100 (not shown). The rear security platform 200 extends back to a collapsible rear edge 202 at an opposite side from the front facing flange 100. This collapsible rear edge 202 would be included in at least a portion of the rear security platform 200 that is exterior to the outer wall of the dwelling. Those skilled in the art will understand that the area of the rear security platform 200 that is exterior to the dwelling is dependent upon the depth of the window opening in the wall of the dwelling. The rear security platform 200 also includes a body portion 203. An upper surface of the body portion 203 is configured to receive the AC unit when it is inserted into the mounting frame 1. That is, the AC unit will rest on the upper surface, thereby preventing the AC unit from hanging suspended out of the window. In this example, the body portion 203 is a continuous piece of material (e.g., steel, composite, etc.). However, the body portion 203 is not required to be continuous, e.g., the body portion 203 may include slats having openings between the slats, holes, etc. The openings or holes may allow any rain or other precipitation from gathering in the mounting frame 1. As mentioned above, at least a portion of the rear security platform 200 is exterior to the outer wall of the dwelling and will be subject to the elements. An embodiment of the mounting frame 1 will allow the rear security platform to fold closed like a briefcase and securely fastened using the hook holes 107 and security platform hooks 111. This allows for securely closing the opening for the AC unit 110 to prevent elements from entering the dwelling or for easy storage.

Figure 4:
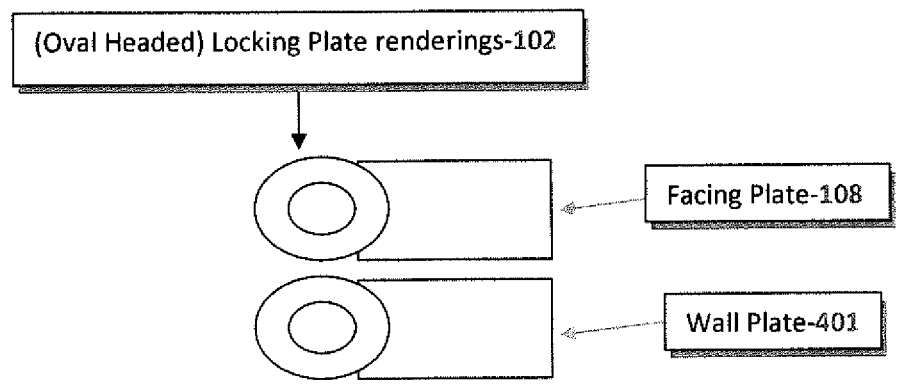
FIG. 4 shows a front view of a locking mechanism used to secure the mounting frame unit according to various embodiments described herein.
Figure 5:
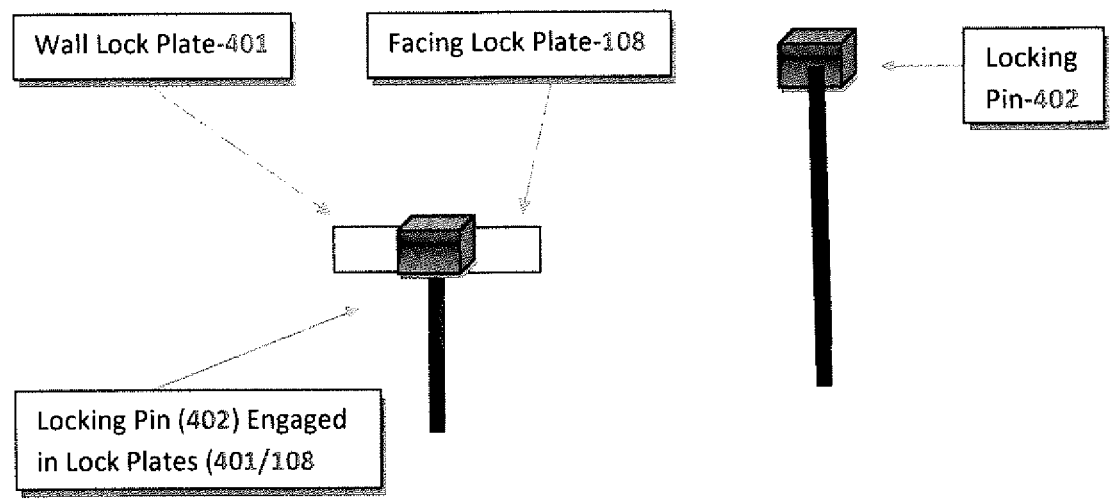
FIG. 5 shows an exemplary embodiment of a locking pin.

FIG. 4 shows the locking apparatus 400 connection between the facing locking plates 108 and the wall locking plates 401. The locking plate connection securely fastens the body of the mounting frame 1 to the interior of the building. This assures that the mounting frame and AC unit cannot be kicked in easily. In this example, the facing locking plate 108 and the wall locking plate 401 comprise an eyelet, but the locking plates may take other forms. FIG. 5 shows the locking pin 402 and the locking pin engaged 402 in the facing locking plate 108 and the wall locking plate 401. The facing locking plates 108 and the wall locking plate 401 are connected and secured by the locking pin 402. The locking pin 402 is inserted through both the facing locking plates 108 and the wall locking plate 401 to secure the mounting frame 1 to the inside of the dwelling and not placing all the tension of the mounting frame 1 on the window that could be pushed in with force. The fastening means assures that the mounting frame 1 is not just supported by the surrounding window but also secured at the point of connection fastening the plates to the structure.

Figure 7:
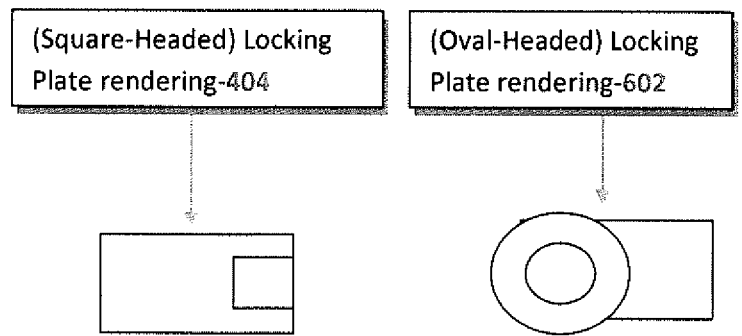
FIG. 7 shows an exemplary embodiment of a square headed locking plate and an Oval/Round-Headed Locking Plate.

FIG. 7 shows, an alternative embodiment of the locking apparatus with a square headed locking plate 404. That is, both the facing locking plate 108 and the wall locking plate 401 may comprise the square headed locking plate 404. Those skilled in the art will understand that the locking pins may be of various shapes and sizes to be received by the locking plates. Additionally, many other methods and embodiments of fastening may be applied to secure the mounting frame 1 to the dwelling structure, such as connecting the locking plates to a wall plate connected to the closest wall stud, or by means of a stud and hook connection.

Figure 6:
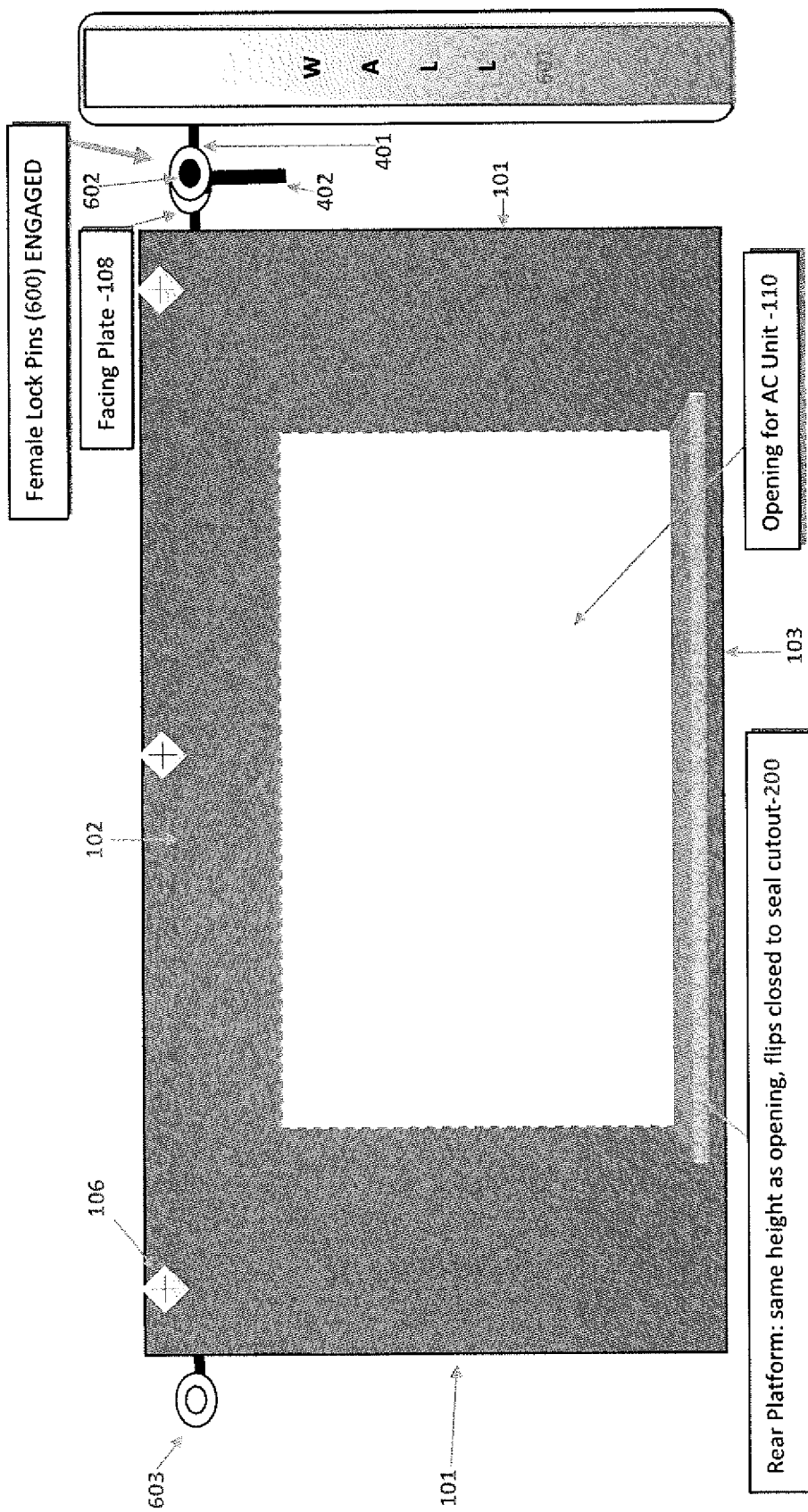
FIG. 6 shows an exemplary embodiment of the mounting frame secured to a wall locking plate.

FIG. 6 shows the inner wall anchoring 600 of a mounting frame 1 to an interior wall 601 using the locking plates. An embodiment of the mounting frame 1 will be attached to interior walls on both sides. The interior wall 601 is adjacent to the side member 101 which includes the facing plate 108. In this example, the locking facing plate 108 comprises an eye or eyelet 602 such as in FIG. 4. The wall plate 401 is coupled to the interior wall 601. Ideally the mounting frame will be coupled to a duality of interior walls on both sides of the frame. The wall plate 401 like the locking facing plate 108 comprises an eye or eyelet 602 such as in FIG. 4. The eye or eyelets are positioned so that the centers of the eye or eyelets 602, of the wall lock plates 401 and 108, are centered and stacked. This allows a locking pin 402 to pass through both the eye or eyelet of 602 of the facing plate 108 and wall plate 401, securing the mounting frame 1 to the interior wall 601. The inner wall anchoring 600 between the mounting frame 1 and the interior wall 601 adds the additional support of the structure to mounting frame 1. This creates a more difficult scenario for a burglar to force the AC unit inward as the force would not just be in on the window but also the interior wall 601. The inner wall anchoring 600 also is quick and easy to remove in case of emergency. A person inside the room could easily pull out the locking pin 402, described above, to undo the anchoring. They then can quickly remove the mounting frame 1 from the window and escape through the window. The anchoring may also be connected to other structural portions of the interior room such as adjacent studs or fixtures in various alternative positions, including using the eyelet 603 on the opposite side member 101.

Figure 8:
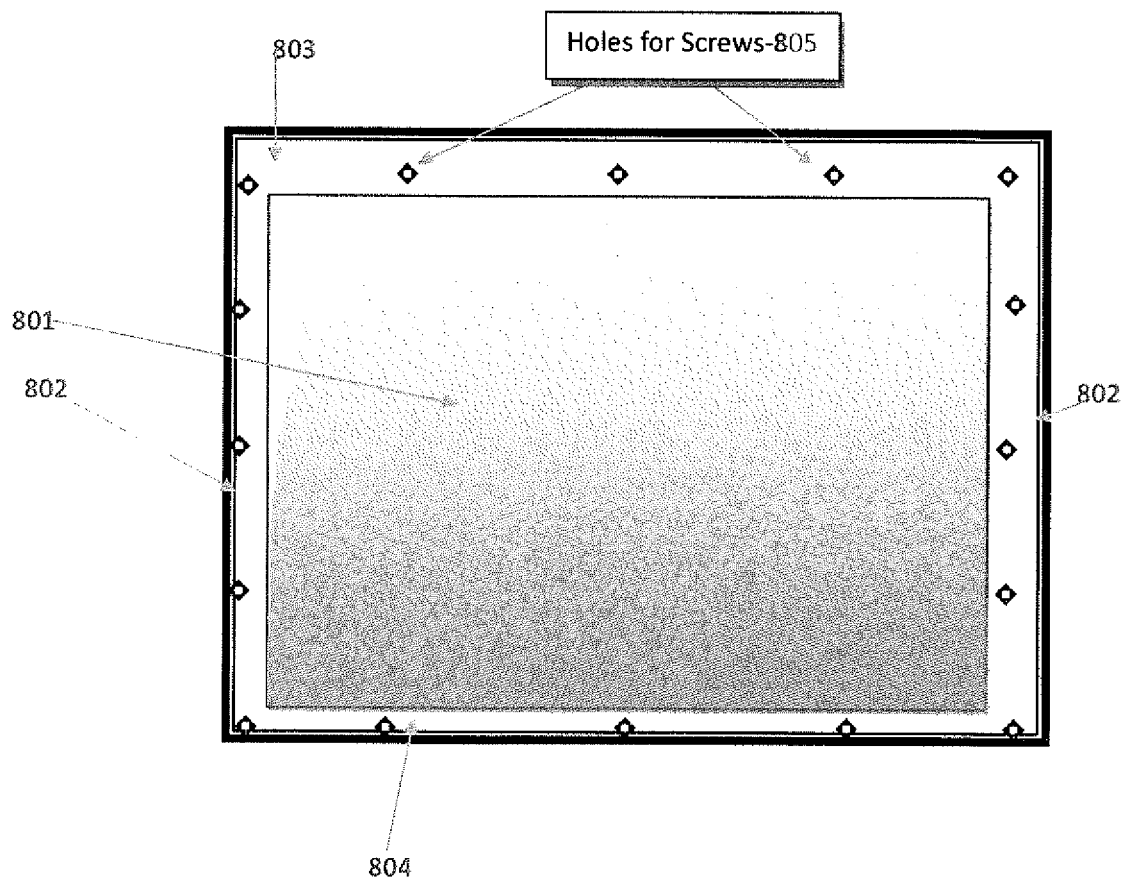
FIG. 8 shows a front view of an exemplary embodiment of a security panel unit according to various embodiments described herein.

FIG. 8 shows an embodiment of the mounting frame with a detachable security panel 800 that is to cover and secure the opening 110 in the mounting frame 1 if the user does not wish to remove the mounting frame 1 after removing the AC unit. Unlike the embodiment of the invention with a hinged rear security platform that fold up to secure the opening 110 this embodiment adapts a separate removable panel. The security panel 800 comprises a filled surface 801 to cover the front facing flange 100. The security panel 800 further comprises adjacent side panel members 802, a top panel member 803, and a bottom panel member 804 that connect to the side facing members 101 of the mounting frame 1, top facing member 102 and bottom facing member 103 respectively. All members 802, 803, and 804 of the security panel 800 may comprise panel screw holes 805 that allows screws to fasten to the mounting frame 1 screw holes 106. The security panel 800 can be placed within the mounting frame 1 when there is no air conditioning unit occupying the space. This is useful if the user would like to remove their air conditioner but not the entire mounting frame 1. This will allow for the rectangular opening 110 to be sealed to prevent an outside draft coming in the dwelling while maintaining the security provided by the inner wall anchoring 600.

Figure 9:
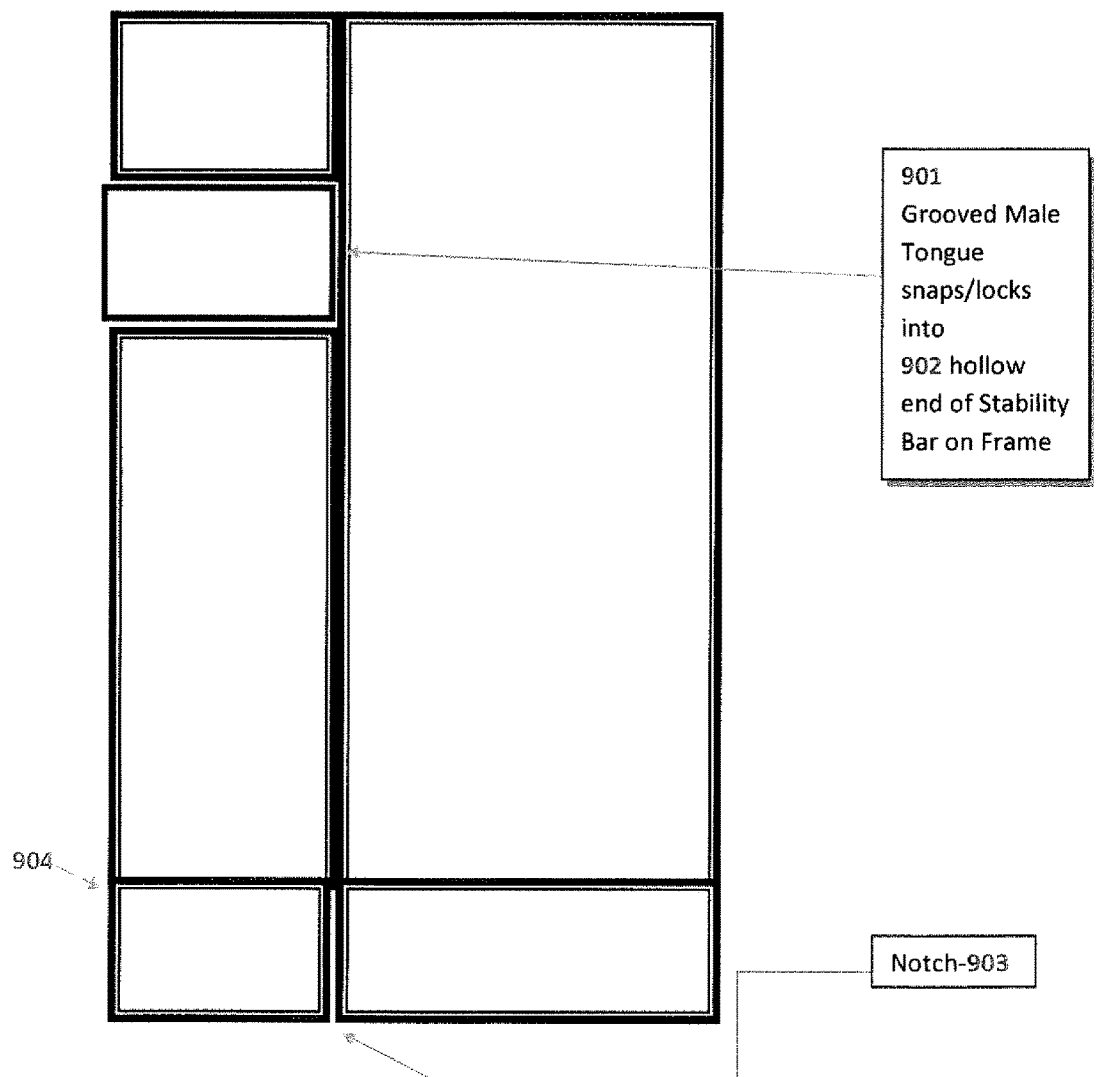
FIG. 9 shows a front view of an expandable panel for use with the mounting frame unit according to various embodiments described herein.

FIG. 9 shows an alternative embodiment, mounting frame 1 may be expanded by the means of expandable panels 900. In such an embodiment, expandable panels 900 may be added to facing members 101, 102, and 103. The expandable panels may be connected by means of a grooved male tongue snap lock 901 into notches 903 on the hollow end of stability bar 902 of the frame walls 101, 102, and 103. Expandable panels 900 may have expandable slide portions 904. The expandable panels allow a user to fill the excess space left in the rectangular opening 110 of the mounting frame 1 when the air conditioning unit does not fit the entire opened space. The expandable panels 900 can vary in size, shape and thickness. The expandable panels may also vary to fit around various shaped air conditioning units. The expandable panels 900 may be used in however many multiples and combinations of types that are needed to fill the excess space. The expandable panels 900 may be connected to other panels by means of a grooved male tongue snap lock 901 into notches 903 or screwed or hooked to the mounting frame or air conditioner. An embodiment of mounting frame 1 would have the expandable panels 900 coupled to the side members 101 for easy deployment, explained further below.

Figure 10:
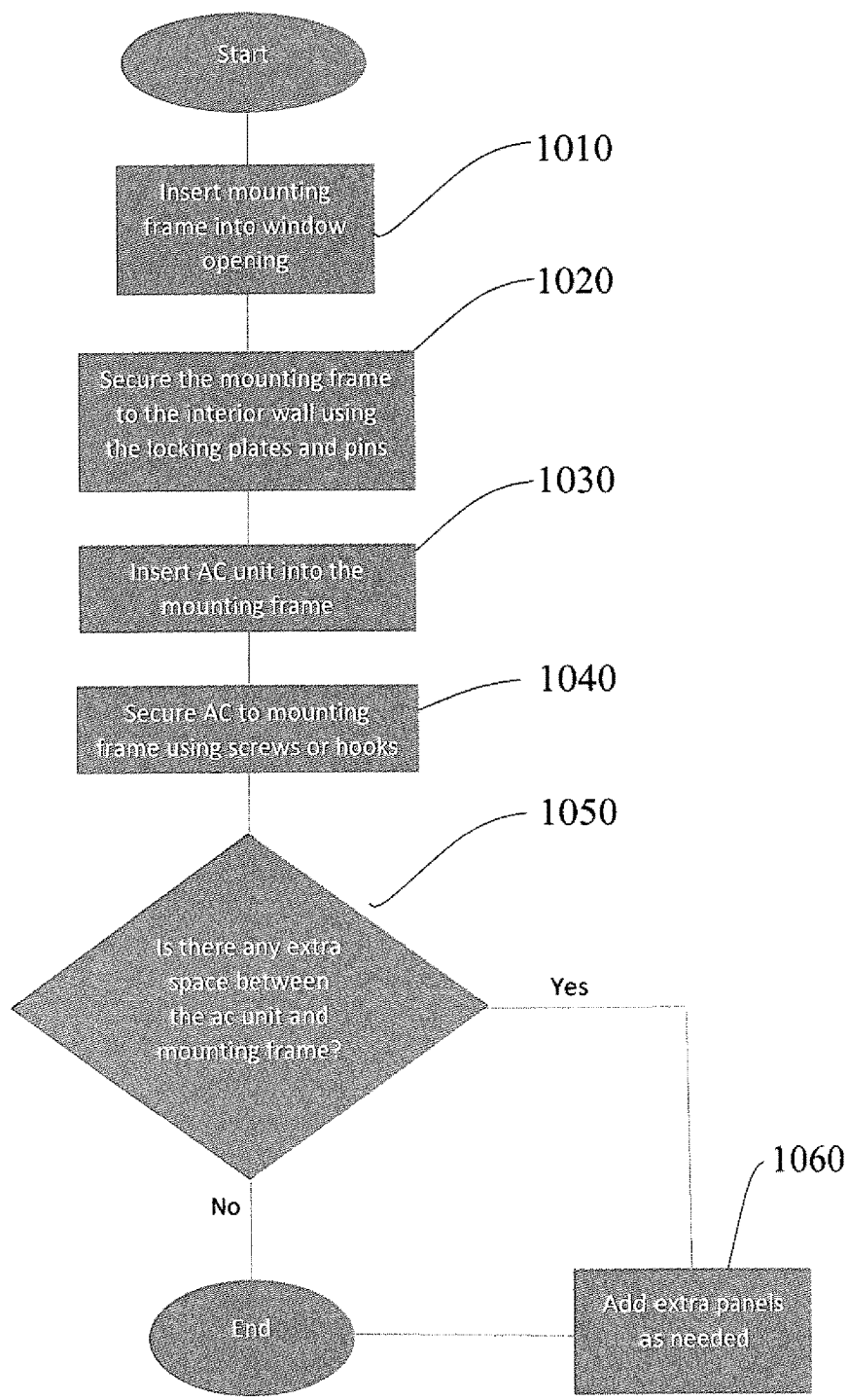
FIG. 10 shows a method for installing the mounting frame for an air conditioning unit.

FIG. 10 shows a flow chart showing an exemplary method for AC unit installation 1000 using the mounting frame 1. In step 1010, a user inserts the mounting frame 1 into the window opening making sure that the rear security platform 200 is facing outside the window. In step 1020 the user then secures the mounting frame 1 to the interior wall 601 using the locking plates 108 and locking pins 402. In step 1030, the user installs the air conditioning unit into the rectangular opening 110 of the front facing flange 100 of the mounting frame 1. In step 1040, the user secures the AC unit to the mounting frame 1 by means of inserting screws into the screw holes 106 or the hooks 107. In optional step 1050 the user then has the option to use the expandable panels 900 if there is excess space and they are needed or be finished with method 1000. In step 1060 the user has opted to add or utilize the expandable panels 900 to the mounting frame 1 and adds them as needed before completing the method for AC unit installation 1000.

Figure 11:
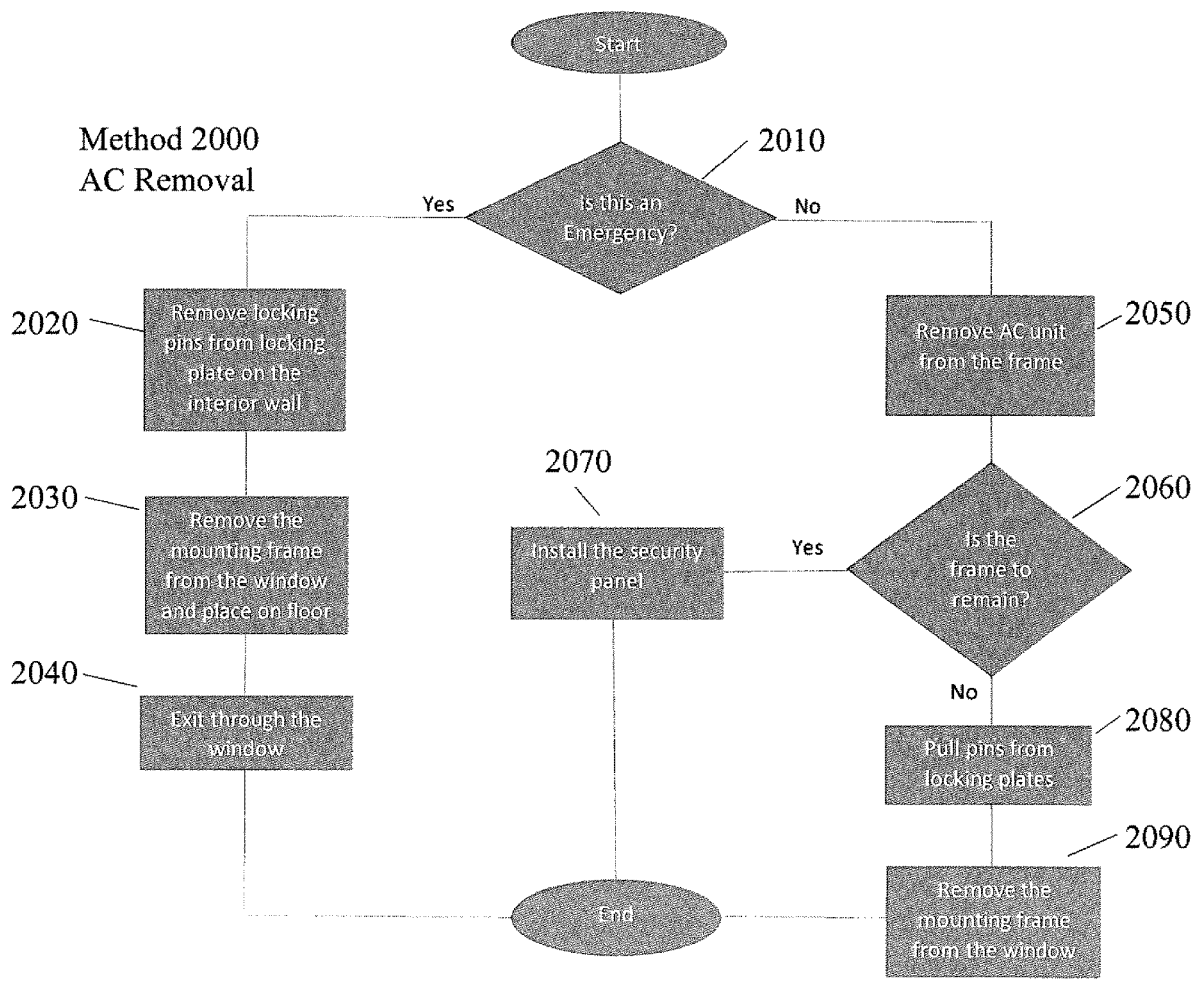
FIG. 11 shows a method for removing the mounting frame for an air conditioning unit.

FIG. 11 shows a flow chart for an exemplary method of AC unit removal 2000 from the mounting frame 1. In step 2010, the option is given to determine if the removal is under an emergency situation such as fire. In the case of an emergency a user would remove the unit in a different manner if not in an emergency. If it were an emergency, step 2020, the user would remove the locking pins 402 from the locking plates 108 on the interior wall or walls under an emergency situation. In step 2030 the user removes the mounting frame 1 and the AC unit from the window and places them on the floor. In step 2040 the user exits through the window to avoid the emergency within the dwelling. In step 2050 there is no emergency and the user removes the AC unit from the rectangular opening 110 by undoing the fastening from screw holes 106 on the front facing flange 100 of the mounting frame 1. In step 2060 the user decides whether to remove the mounting frame 1 or let it remain in the window. In step 2070, the user chose to let the mounting frame 1 remain in the window and pulls in the security panel 800 to seal the opening 110. In step 2080, the user choses to remove the mounting frame 1 from the window and removes the pins 402 from the locking plate 108. In step 2090 the user removes the mounting frame 1 from the window and completes the method of AC removal 2000.

FIG. 11 shows an alternative embodiment of the mounting frame 1 showing the rear security platform 200 closed over the opening for AC unit-110. This embodiment is accomplished by folding the rear security platform about a hinge connection to an upright closed position. This embodiment allows for easy closing off from the outside elements when an AC unit is not in the mounting frame 1. It also allows for easy storage as the entire apparatus can be made slim by folding the rear mounting platform 200 into the upright position. When the rear security platform 200 is upright covering the opening 110 it can be fastened by means of the security platform hooks 111 that couple into the hook holes 107. FIG. 11. Also shows a simplified embodiment of the mounting frame 1 wherein the screw holes 106 are only on the top member 102.

Figure 12:
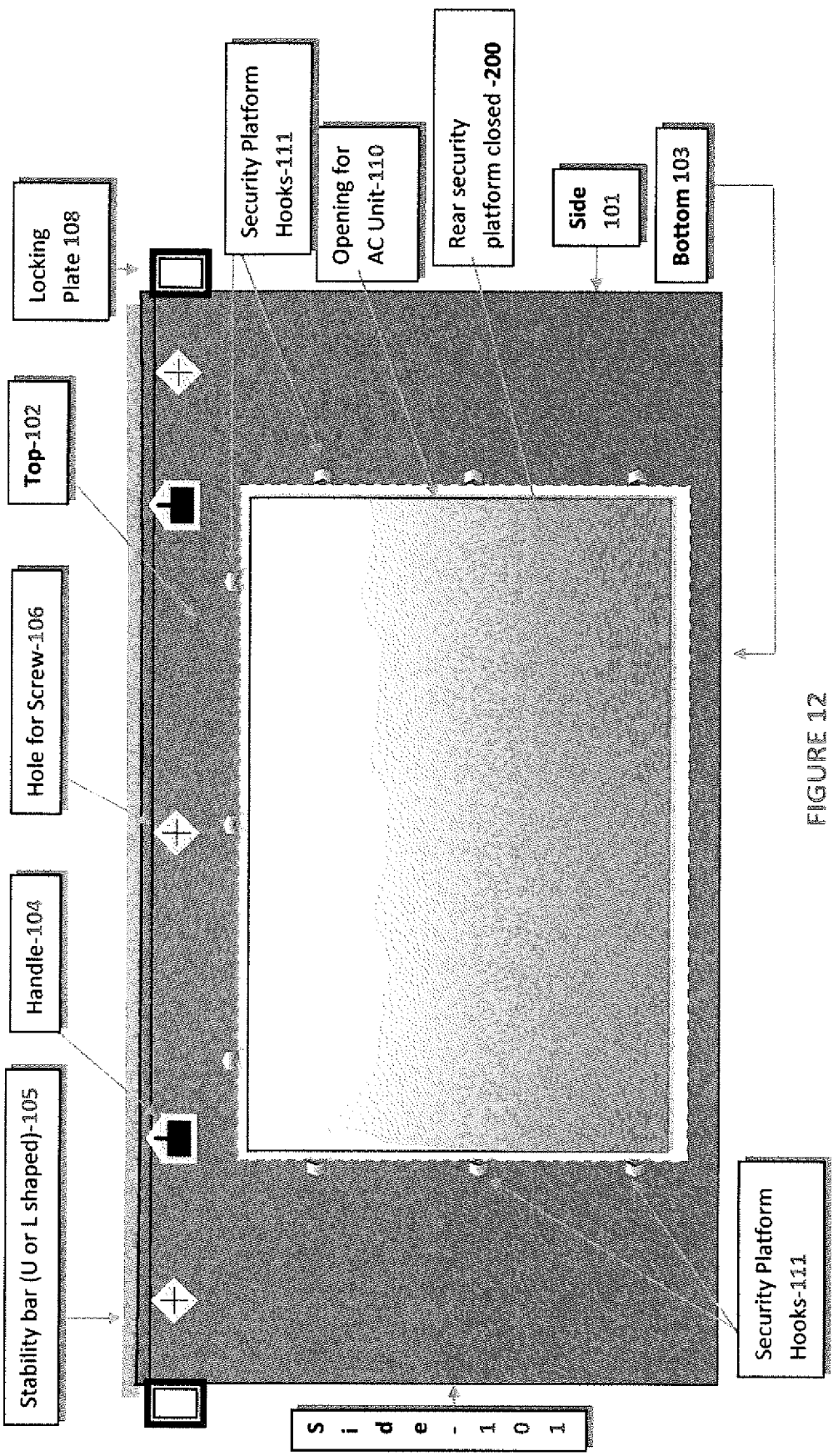
FIG. 12 shows a front view of an exemplary embodiment of the mounting frame with a closed security panel.
Figure 13:
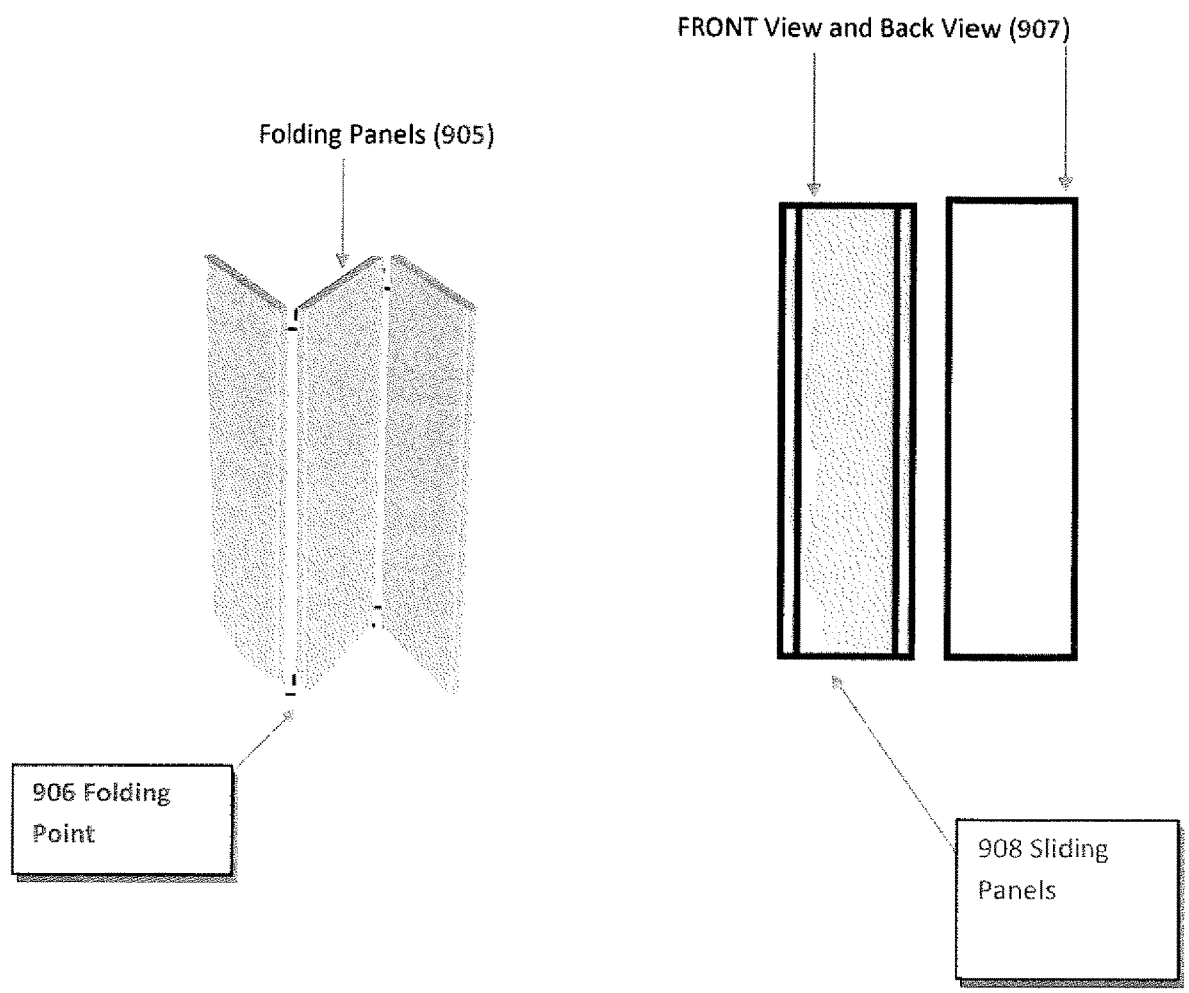
FIG. 13 shows an exemplary embodiment of expandable panels for the mounting frame.

FIG. 12 shows an alternative embodiment of mounting frame 1 with attached expandable panels 900. In this embodiment the expandable panels 900 are coupled to the side members 101 of the mounting frame 1 so that they may easily be deployed. The expandable panels maybe of the sliding or folding sort. The folding panels 905 would expand in an accordion manner along folding points 906 from the side member 101 inwards to meet the AC unit. The folding panels 905 would stack up and stowed when not in use. The sliding panels 908 slide from the side member 101 inwards toward the AC unit. Both methods of attached expandable panels may also be applied to the top member 101 and bottom member 103.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A mounting frame for an air conditioning unit, comprising:
   a front facing flange comprising,
   a top member,
   a bottom member, and
   two side members that form a rectangular opening; and
   a rear security platform coupled to the front facing flange, wherein, when the mounting frame is installed into a window, the front facing flange is configured to receive the air conditioning unit through the rectangular opening and the rear security platform supports the air conditioning unit,
   a locking plate connected to at least one of the side members; the locking plate extending from the at least one of the side members and having an eyelet, the eyelet configured to receive a quick release locking pin for securing the mounting frame to an interior structure of a building in which the air conditioning unit is installed; and
   wherein the rear security platform is coupled to the bottom member via a hinge, wherein, in an open position, the rear security platform is configured to receive the air conditioning unit, and, in a closed position, the rear security platform is configured to seal the rectangular opening.

2. The mounting frame of claim 1, where the top member comprises one of an L-shaped stability bar or a U-shaped stability bar.

3. The mounting frame of claim 1, where the side members include screw holes or hooks for securing the air conditioning unit to the mounting frame.

4. The mounting frame of claim 1, wherein the rear security platform is moved to the closed position by attaching the rear security platform to one of the side members or top member of the front facing flange via a hook.

5. The mounting frame of claim 1, further comprising:
   one or more panels coupled to the front facing flange and configured to be one of slid out or folded out to abut the air conditioning unit to seal any excess space in the rectangular opening when the air conditioning unit is installed.

6. The mounting frame of claim 1, where the front facing flange includes a handle.

7. The mounting frame of claim 1, further comprising a wall plate for engaging with the locking plate.

8. The mounting frame of claim 7, wherein the wall plate has an eyelet so that the eyelet of the wall plate and the eyelet of the locking plate are aligned in a stacked configuration for the quick release locking pin to pass therethrough.

9. The mounting frame of claim 8, further comprising a second locking plate extending from the other of the side members for engaging with a second wall plate, the second locking plate and the second wall plate respectively comprising eyelets that are aligned in a stacked confirmation for a second quick release locking pin to pass therethrough.

10. The mounting frame of claim 1, wherein a second locking plate extends from the other of the side members.

11. The mounting frame of claim 1, further comprising: a panel configured to be coupled to the front facing flange and air conditioning unit to seal any excess space in the rectangular opening when the air conditioning unit is installed.

12. The mounting frame of claim 11, wherein the panel comprises a plurality of panels.

13. The mounting frame of claim 1, where the mounting frame comprises one of plastic, wood, fiberglass, metal or a composite material.

14. The mounting frame of claim 1, wherein the quick release locking pin is threadless.

15. A method for installing a mounting frame for an air conditioning unit into a window comprising:
providing a mounting frame of claim 1;
inserting the mounting frame into a window opening;
securing the mounting frame to the interior structure using the locking plate and the quick release locking pin;
installing the air conditioning unit into the opening of the front facing flange of the mounting frame, securing the air conditioning unit to the mounting frame.

16. The method for installing the mounting frame for an air conditioning unit into a window of claim 15 comprising: using expandable panels to reduce excess space between the air conditioner and the front facing flange.

17. A method for removing a mounting frame for an air conditioning unit from a window, comprising:
providing a mounting frame of claim 1;
removing the quick release locking pin from the locking plate on the interior structure,
removing the air conditioner from the rectangular opening of the front facing flange of the mounting frame,
performing at least one of folding the rear security platform towards the front facing flange to seal the rectangular open, or removing the mounting frame from the window.

* * * * *